US006380731B1

(12) United States Patent
Nishimoto

(10) Patent No.: US 6,380,731 B1
(45) Date of Patent: Apr. 30, 2002

(54) MOTOR UNIT WITH AN INTEGRATED SPEED SENSOR FOR A BICYCLE HUB TRANSMISSION

(75) Inventor: Naohiro Nishimoto, Hashimoto (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/449,238

(22) Filed: Nov. 24, 1999

(51) Int. Cl.[7] ............................. G01P 3/48; G01P 3/54; B62M 25/00; B62M 9/00
(52) U.S. Cl. ..................... 324/173; 280/238; 324/226
(58) Field of Search .................. 280/236, 238; 474/69, 70, 78; 324/173, 174, 207.25, 226

(56) References Cited

U.S. PATENT DOCUMENTS 4,430,800 A    2/1984   Shimano ................. 33/141
4,946,425 A  * 8/1990   Buhlmann ............... 280/238

FOREIGN PATENT DOCUMENTS

JP            59-92812          6/1984

* cited by examiner

*Primary Examiner*—Walter Snow
(74) *Attorney, Agent, or Firm*—James A. Deland

(57) ABSTRACT

A motor unit is provided for operating an internal hub transmission, and a speed sensor is mounted to the motor unit for detecting a speed signal external to the motor unit. Since the speed sensor is mounted to the motor unit, the position of the speed sensor can be securely fixed on the bicycle. Also, the wire for the speed sensor may be integrated into the wiring harness for the motor, thus eliminating the requirement of a separate wire route along the bicycle.

23 Claims, 4 Drawing Sheets

MOTOR UNIT WITH AN INTEGRATED SPEED SENSOR FOR A BICYCLE HUB TRANSMISSION

BACKGROUND OF THE INVENTION

This invention is related to bicycle computers and, more particularly, to a speed sensor that is integrated into a motor unit used to shift a bicycle transmission.

Bicycle computers are often used to measure, calculate and display various riding parameters such as bicycle speed, distance traveled, pedaling speed, etc. Such computers usually include a display that is mounted to the handlebar and at least one sensor assembly mounted to the front or rear wheel. The sensor assembly usually includes a magnet that is mounted to one of the wheel spokes and a magnetic sensor that is mounted to the bicycle frame such that the magnet passes in close proximity to the sensor as the wheel rotates. The magnetic sensor is connected to a wire which, in turn, is routed along the bicycle frame to the display.

One problem with known bicycle computers is that the magnetic sensor is mounted to a small diameter portion of the frame, such as a steering fork tube or a rear chainsaw, using a strap. Because of the small diameter of the tube the strap may not be able to apply much friction to keep the sensor properly positioned, and the sensor may rotate around the tube or move along the tube until the sensor no longer accurately senses the magnet. This effect is especially severe when the tube is tapered and not round. As a result, the rider must periodically adjust the position of the sensor. Another problem with conventional bicycle computers is that the wire from the sensor to the display gives the bicycle a cluttered look, especially when there are other electrical components mounted to the bicycle, each with their own wires.

SUMMARY OF THE INVENTION

The present invention is directed to a speed sensor that is integrated with a motor unit used to shift a bicycle transmission. In one embodiment of the present invention, a motor unit is provided for operating an internal hub transmission, and a speed sensor is mounted to the motor unit for detecting a speed signal external to the motor unit. Since the speed sensor is mounted to the motor unit, the position of the speed sensor can be securely fixed on the bicycle. Also, the wire for the speed sensor may be integrated into the wiring harness for the motor, thus eliminating the requirement of a separate wire route along the bicycle.

The motor unit may include an annular housing for receiving a wheel axle therethrough, a drive ring which rotates around a drive ring axis for engaging the hub transmission, and a motor for rotating the drive ring. As a result, the motor unit may be placed in very close proximity to the hub transmission and hence be in very close proximity to the wheel spokes where a signal source such as a magnet is mounted. Because the motor unit can be securely mounted to the bicycle frame, the sensor may be firmly mounted to the housing in a cantilevered manner and extend toward the spokes to be closer to the signal source with less risk of movement than would otherwise be possible.

DETAILED DESCRIPTION OF THE EMBODIMENTS

Figure 1:
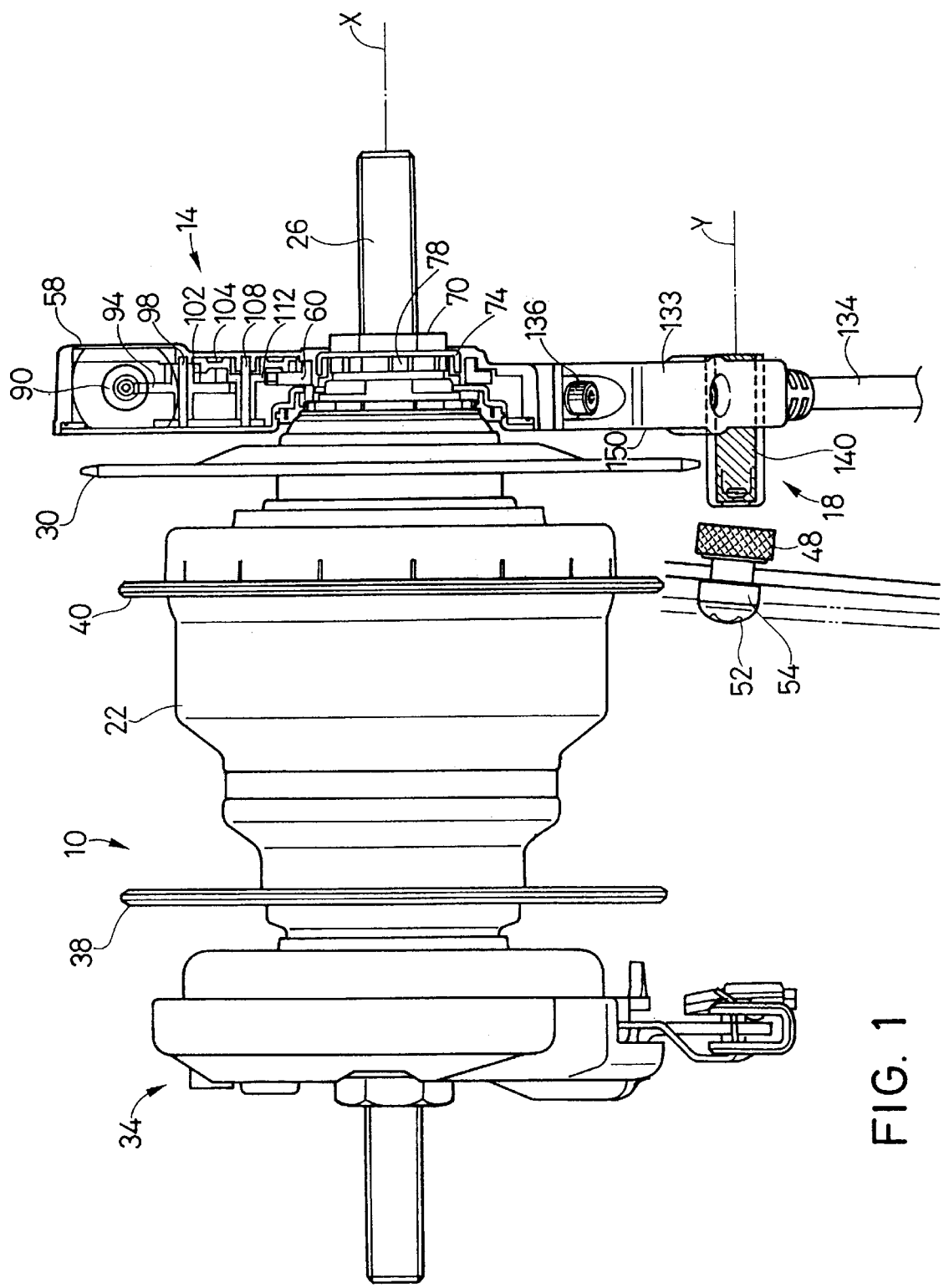
FIG. 1 is a rear view of a particular embodiment of a bicycle hub transmission, motor drive and speed sensor according to the present invention.
Figure 2:
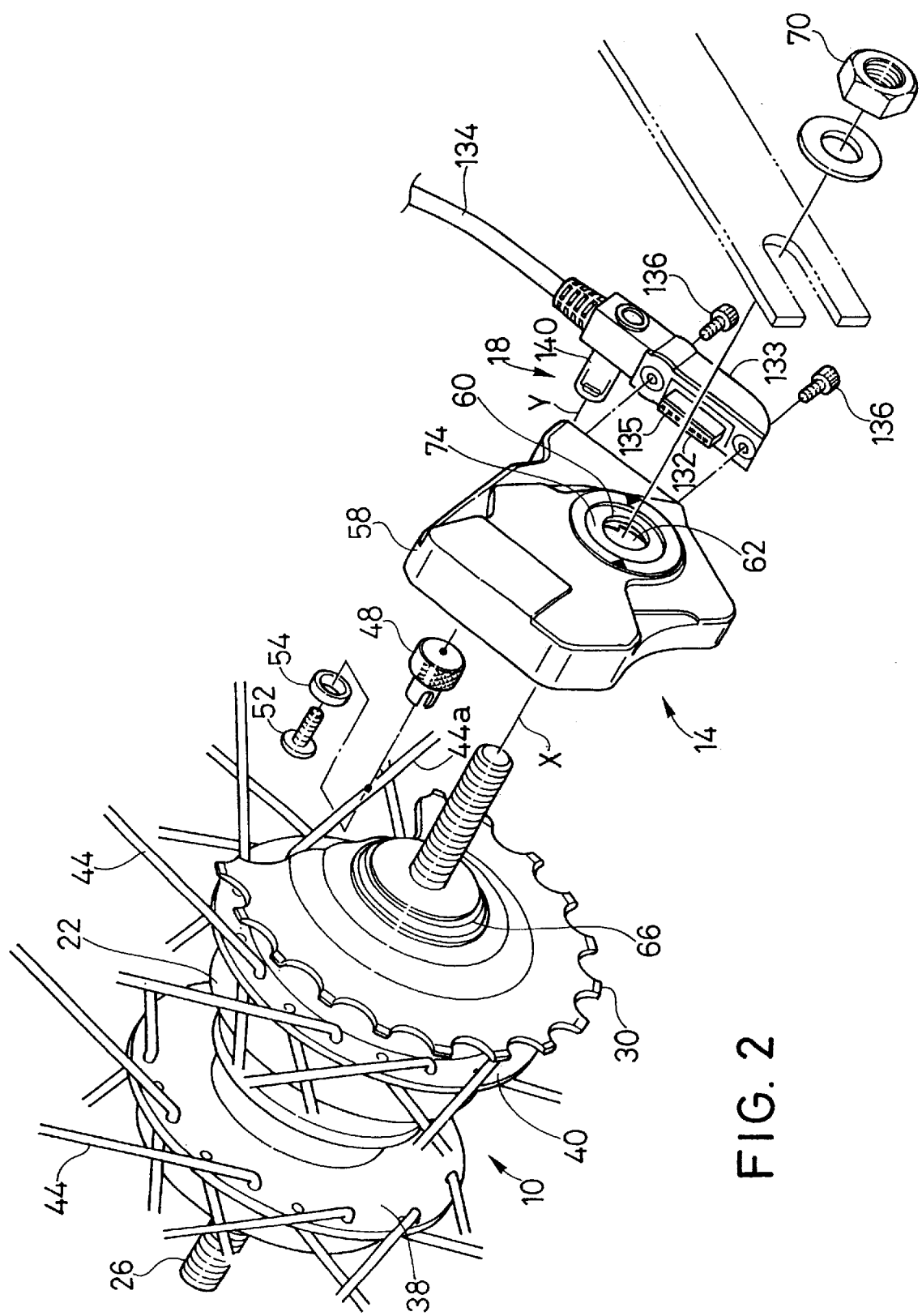
FIG. 2 is a partially exploded view of the bicycle hub transmission, motor drive and speed sensor shown in FIG. 1.

FIG. 1 is a rear view of a particular embodiment of a bicycle hub transmission 10, motor drive 14 and speed sensor 18 according to the present invention; and FIG. 2 is a partially exploded view of the bicycle hub transmission 10, motor drive 14 and speed sensor 18 shown in FIG. 1. Hub transmission 10 is a conventional bicycle hub transmission such as a hub transmission sold by Shimano, Inc. under the brand name Nexus®. Hub transmission 10 includes a hub shell 22 that rotates around a hub axle 26 defining an axle axis X. A drive sprocket 30 applies a driving force from a chain (not shown) to a planetary gear transmission (not shown) located within hub shell 22 for communicating the drive force from the chain to hub shell 22 through a plurality of power transmission paths in a well known manner. A conventional hub brake 34, also sold under the brand name Nexus®, may be used with hub transmission 10. Since hub transmission 10 and hub brake 34 are known structures, a detailed description of them shall be omitted.

Hub shell 22 includes a pair of spoke flanges 38 and 40 for mounting a plurality of spokes 44 which, in turn, are mounted to the wheel rim (not shown). A signal source in the form of a magnet 48 is mounted to one of the spokes 44a in a conventional manner using a screw 52 and collar 54.

Figure 3:
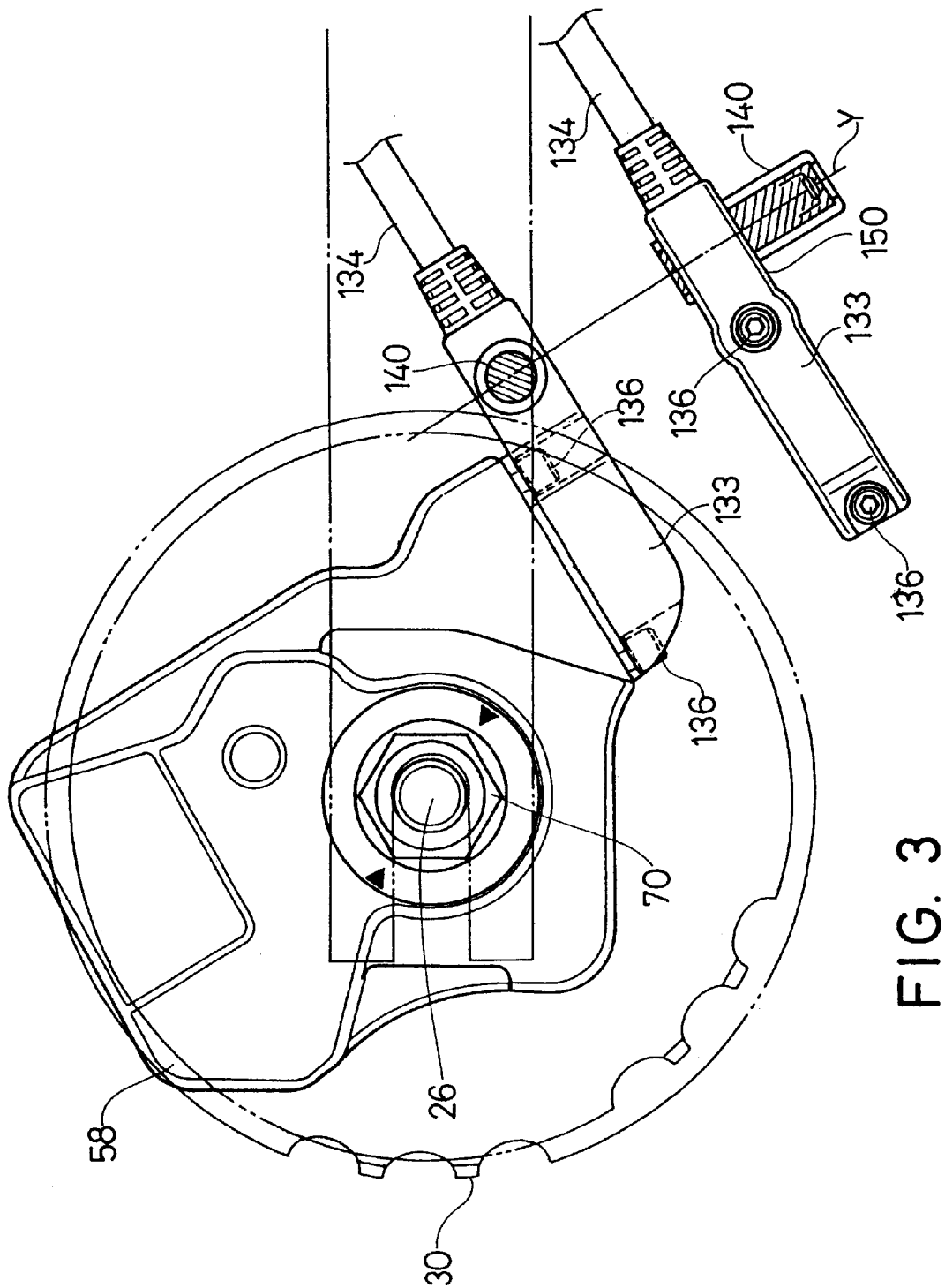
FIG. 3 is a side view of the motor housing and connector shown in FIG. 2.

As shown in FIGS. 1–3, motor drive 14 includes an annular motor housing 58 with a drive ring 60 defining an opening 62 for receiving axle 26 therethrough. When motor drive 14 is mounted to hub transmission 10, drive ring 60 engages a rotatable clutch actuator 66 that forms a part of hub transmission 10, and motor drive 14 is retained to hub transmission 10 by a nut 70 that presses against a mounting flange 74 of motor drive 14 which, in turn, presses against a hub nut 78 that holds the components of hub transmission 10 together.

Figure 4:
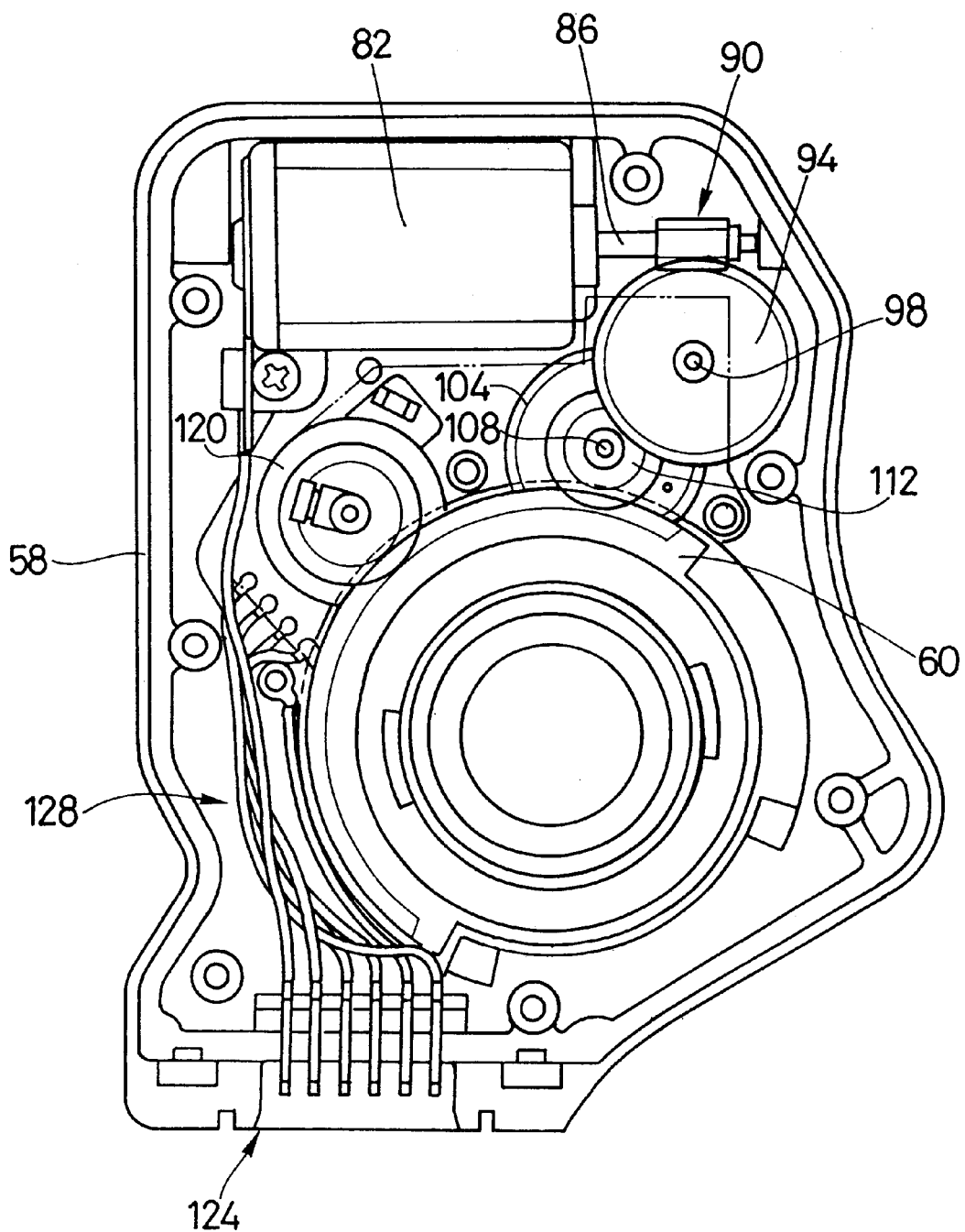
FIG. 4 is a cutaway view of the motor housing.

As shown more specifically in FIGS. 1 and 4, disposed within motor housing 58 is a motor 82 with a drive shaft 86 supporting a drive gear 90 which engages a large diameter gear 94 that is rotatably mounted to motor housing 58 through a shaft 98. A small diameter gear 102 is integrally formed with large diameter gear 94, and this small diameter gear 102 engages a large diameter gear 104 that is rotatably supported to motor housing 58 through a shaft 108. A small diameter gear 112 that is integrally formed with large diameter gear 104 engages drive ring 60 for rotating drive ring 60 around axle axis X which also functions as a drive ring axis. Thus, large diameter gear 94, small diameter gear 102, large diameter gear 104 and small diameter gear 112 form a gear reduction unit so that drive ring 60 rotates at a smaller rate than drive gear 90. A potentiometer 120 also engages drive ring 60 for providing a signal indicating the position of drive ring 60. The signals for driving motor 82 and the signals from potentiometer 120 are provided to a male electrical connector 124 through wires 128.

A female electrical connector 132 in the form of a removable plug disposed in a connector housing 133 is located at the end of a multiwire signal communicating cable 134. Female electrical connector 132 includes a plurality of electrical contacts 135 that contact the corresponding electrical contacts in male electrical connector 124. Female electrical connector 132 is retained in place on motor housing 58 by retaining screws 136. A magnetic sensor 140 is mounted to an external side surface 150 of connector housing 133 that faces hub transmission 10. Sensor 140 may be mounted by adhesive, press fitting, bonding, or any number of methods. In this embodiment, magnetic sensor 140 is a cylindrical member having a concentric longitudinal axis Y that extends substantially perpendicular to side surface 150 of connector housing 133 and parallel to axle axis X.

Since motor housing 58 is securely mounted to axle 26, and since connector housing 133 is securely mounted to motor housing 58, the position of sensor 140 is very stable. Also, since connector housing 133 is usually made from a firm and strong material, sensor 140 can be stably supported to connector housing 133 in a cantilevered manner. This, in turn, allows sensor 140 to extend a relatively large distance to a position very close to magnet 48.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A speed sensing apparatus for a bicycle planetary gear hub transmission comprising:
   a motor unit for operating the planetary gear hub transmission; and
   a speed sensor mounted to the motor unit for detecting a speed signal external to the motor unit.

2. The speed sensing apparatus according to claim 1 wherein the speed sensor comprises a magnetic sensor.

3. A speed sensing apparatus for a bicycle hub transmission comprising:
   a motor unit for operating the hub transmission;
   a speed sensor mounted to the motor unit for detecting a speed signal external to the motor unit; and
   an electrical connector for communicating signals to and from the motor unit, wherein the speed sensor is momted to the electrical connector.

4. The speed sensing apparatus according to claim 3 wherein the electrical connector comprises a removable plug having a plurality of electrical contacts.

5. The speed sensing apparatus according to claim 3 wherein the speed sensor extends from an external side surface of the electrical connector.

6. The speed sensing apparatus according to claim 5 wherein the electrical connector comprises a removable plug having a plurality of electrical contacts.

7. The speed sensing apparatus according to claim 6 wherein the speed sensor extends substantially perpendicular to the external side surface of the electrical connector.

8. The speed sensing apparatus according to claim 7 wherein the speed sensor has a substantially cylindrical shape.

9. The speed sensing apparatus according to claim 1 wherein the motor unit comprises an annular housing for receiving a hub axle therethrough.

10. A speed sensing apparatus for a bicycle hub transmission comprising:
    a motor unit for operating the hub transmission;
    wherein the motor unit comprises an annular housing for receiving a hub axle therethrough;
    a speed sensor mounted to the motor unit for detecting a speed signal external to the motor unit;
    wherein the motor unit further comprises:
        a drive ring for engaging the hub transmission, wherein the drive ring rotates around a drive ring axis; and
        a motor for rotating the drive ring.

11. The speed sensing apparatus according to claim 10 wherein the drive ring and the motor are disposed in the annular housing.

12. The speed sensing apparatus according to claim 10 wherein the speed sensor extends along a speed sensor axis substantially parallel to the drive ring axis.

13. The speed sensing apparatus according to claim 12 wherein the speed sensor has a substantially cylindrical shape.

14. The speed sensing apparatus according to claim 10 further comprising an electrical connector for communicating signals to and from the motor unit, and wherein the speed sensor is mounted to the electrical connector.

15. The speed sensing apparatus according to claim 14 wherein the electrical connector comprises a removable plug having a plurality of electrical contacts.

16. The speed sensing apparatus according to claim 14 wherein the speed sensor extends from an external side surface of the electrical connector.

17. The speed sensing apparatus according to claim 16 wherein the electrical connector comprises a removable plug having a plurality of electrical contacts.

18. The speed sensing apparatus according to claim 17 wherein the speed sensor extends substantially perpendicular to the external side surface of the electrical connector.

19. The speed sensing apparatus according to claim 18 wherein the speed sensor has a substantially cylindrical shape.

20. A speed sensing apparatus for a bicycle wheel comprising:
    a hub transmission that rotates around a hub axle;
    a plurality of spokes extending radially outwardly from the hub transmission;
    a speed signal providing unit disposed on at least one of the plurality of spokes for providing a speed signal;
    a motor unit for operating the hub transmission; and
    a speed sensor mounted to the motor unit for detecting the speed signal.

21. The speed sensing apparatus according to claim 20 wherein the speed sensor comprises a magnetic sensor.

22. A speed sensing apparatus for a bicycle wheel comprising:
    a planetary gear hub transmission that rotates around a hub axle;
    a speed signal providing unit that rotates together with the planetary gear hub transmission for providing a speed signal;
    a motor unit for operating the hub transmission; and
    a speed sensor mounted to the motor unit for detecting the speed signal.

23. The speed sensing apparatus according to claim 22 wherein the speed sensor comprises a magnetic sensor.

* * * * *